United States Patent [19]

Miller

[11] 4,216,115
[45] Aug. 5, 1980

[54] PREVENTION OF DISCOLORATION IN SUBSTITUTED DIPHENYLAMINES

[75] Inventor: Donald E. Miller, Akron, Ohio

[73] Assignee: The Goodyear Tire & Rubber Company, Akron, Ohio

[21] Appl. No.: 963,235

[22] Filed: Nov. 22, 1978

[51] Int. Cl.$^2$ ............................................. C09K 15/32
[52] U.S. Cl. ................................ 252/400 R; 252/401; 260/45.9 R; 260/45.85 H; 260/809; 260/799
[58] Field of Search ............... 252/400 R, 401, 384; 260/45.9 R, 809, 799, 45.85 H, 803, 810

[56] References Cited

U.S. PATENT DOCUMENTS

| | | | |
|---|---|---|---|
| 3,502,615 | 3/1970 | Rosenward | 252/401 |
| 3,530,076 | 9/1970 | Sparks et al. | 252/401 |
| 3,542,692 | 11/1970 | Spacht | 252/401 |
| 3,674,705 | 7/1972 | Hytrek | 252/400 R |
| 3,746,654 | 7/1973 | Cottman | 252/400 A |
| 3,785,995 | 1/1974 | Kalil | 252/401 |

Primary Examiner—Benjamin R. Padgett
Assistant Examiner—J. L. Barr
Attorney, Agent, or Firm—J. Y. Clowney

[57] ABSTRACT

Detrimental color changes in liquid diphenylamine age-resisters have been inhibited and/or reduced by combining with the age-resisters small amounts of a color inhibitor selected from the group consisting of trialkylol amines, glycol diesters of sulphur-containing monocarboxylic acids, and dialkyl esters of thiodicarboxylic acids in a weight ratio of color inhibitor to age-resister of from 0.25:99.75 to 5:95.

5 Claims, No Drawings

PREVENTION OF DISCOLORATION IN SUBSTITUTED DIPHENYLAMINES

TECHNICAL FIELD

This invention pertains to diphenylamine antioxidants which are of particular use in the rubber industry. More particularly, it pertains to color stabilization of these age-resistors.

Diphenylamine antioxidants are commonly added directly to rubber (e.g. SBR, NR, CR, NBR) during mixing of a given product formulation. For some applications, it is a convenience to use a dry, particulate form of the antioxidant. In the case of liquid antioxidants this is achieved through absorption of the antioxidant onto a filler. For present purposes, the terms liquid, liquid age-resistor and liquid antioxidant refer to materials which are pourable liquids at 20° C. and atmospheric pressure. The liquid diphenylamine antioxidant is mixed with the filler material in a mixing apparatus (e.g. double cone, V-type or ribbon blender) or sprayed onto the filler. This technique of converting a liquid, which is viscous and tacky, to a dry powder is well-known in the art.

The resulting particulates have some desirable characteristics, such as good flow properties and reduced mill time in making some rubber compounds. One example of an appropriate filler material is diatomite which comes in a variety of forms. One of these forms which has been found particularly useful is synthetic, hydrous calcium silicate produced by the hydrothermal reaction of diatomaceous silica, hydrated lime, and water. Hydrous calcium silicates have excellent flowability, low bulk density, and a high liquid absorption.

Variation in the color of powdered diphenylamine antioxidants detracts from the value of the product. Colors ranging from dark gray to light green have been noted and are theorized to result from a chemical change prompted by excessive heat during the preparation of the powder blend.

BACKGROUND

The investigation which led to this invention was directed particularly toward stabilizing a powdered diphenylamine antioxidant (mixture of styrenated diphenylamines obtained as Wingstay 29, a trademark of Goodyear Tire & Rubber Company) absorbed onto a hydrous calcium silicate obtained as Micro-Cel E, a product of Johns-Manville Co. The Micro-Cel E has nominal properties as follows: specific gravity of 2.45, bulk density of 5.5 pounds per cubic foot (8.79 Kg/m$^3$), and an ability of absorb 490 percent of its weight in oil.

The generic formula of the diphenylamines to which this invention is applicable is:

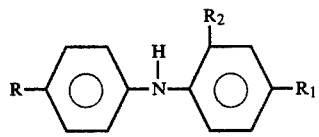

wherein R and R$_1$ are selected from hydrogen (provided only one of them is hydrogen) tertiary alkyl radicals having 4 to 12 carbon atoms (4–12C) and the group

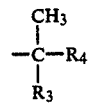

wherein R$_3$ is selected from H and methyl and R$_4$ is selected from phenyl and p-tolyl radicals; and R$_2$ is selected from H and 1-methyl benzyl.

Wingstay 29 powder is normally sold in a ratio of about 68 weight percent Wingstay 29 to 32 weight percent Micro-Cel E and is normally a light tan color. One of its uses is in compounds for rubber bands.

A variety of organic and inorganic chemicals were tested as additives to halt the color formation. Neither tris (nonylphenyl) phosphite nor sodium borohydride prevented discoloration. Dilauryl thiodipropionate had a slight benefit.

SUMMARY OF THE INVENTION

Detrimental color changes in diphenylamine age-resisters have been inhibited and/or reduced by combining with the age-resister small amounts of a color inhibitor selected from the group consisting of trialkylol amines, glycol diesters of sulphur-containing monocarboxylic acids, and dialkyl esters of thiodicarboxylic acids in a weight ratio of color inhibitor to age-resistor of from 0.25:99.75 to 5:95.

The trialkylol amines have the structure:

wherein R$_5$ is an alkylene radical of from 2 to 5 carbons (2–5C).

The glycol diesters have the following structure:

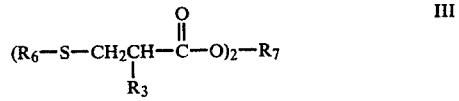

wherein R$_6$ is an alkyl radical (1–24C), R$_7$ is a polyalkyl glycol radical having the structure:

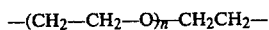

wherein n is an integer from 1 to 7, and R$_3$ is as defined previously.

These glycol diesters of sulphur-containing monocarboxylic acids may be prepared by known esterification techniques which are exemplified by U.S. Pat. No. 2,601,063, Column 1, line 30-Column 3, line 71, which is hereby incorporated by reference.

The dialkyl esters of thiodicarboxylic acids have the structure:

wherein R$_8$ is an alkyl radical (11–15C) and R$_9$ is an alkylene radical (2–3C).

The most effective concentration of color inhibitor varies with the individual inhibitor used.

The weight ratio of the age-resistor/color inhibitor combination to the filler material can range from 80:20 to 1:99, but a more practical range is from 80:20 to 50:50.

The upper limit of this ratio is the point at which the blend begins to lose the desirable flow properties of a particulate solid.

DESCRIPTION OF THE PREFERRED EMBODIMENTS

Preferably, the ratio of color inhibitor to age-resister is below the point at which the color inhibitor is insoluble in the age-resister, more preferably about 2:98, and the ratio of the age-resister/color inhibitor combination to filler is about 70:30.

The Wingstay 29 utilized in developing this invention is the Friedel-Crafts reaction product of diphenylamine and styrene in a weight ratio of about 1:2. It is a mixture of diphenylamine derivatives, the most prevalent of which have the formula:

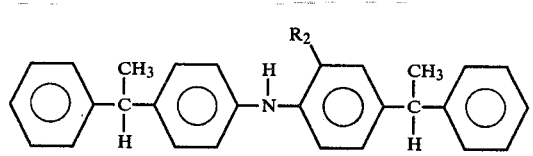

Other isomers of distyrenated diphenylamine are present, as well as mono and tri-styrenated derivatives, and unreacted diphenylamine.

Wingstay 29 is a viscous liquid with nominal properties as follows: specific gravity of 1.08 and a vapor pressure less than one mm Hg at 20° C.

The invention will be further clarified by a consideration of the following examples, which are intended to be purely exemplary. Unless otherwise stated, parts are parts by weight and percentages are by weight.

EXAMPLE I

Small samples of powdered Wingstay 29 were prepared incorporating five chemical additives, and a control sample having no additives was also prepared. The weight ratio of Wingstay 29 or Wingstay 29/additive combination to Micro-Cel E (the filler used in all the examples) was 67:33. Initially, all samples were practically identical in color. The additives are listed in Table Number 1.

Table 1

| Sample | Additive | Weight Ratio Additive/Wingstay 29 |
|---|---|---|
| 1 | None | 0 |
| 2 | tris (nonylphenyl) phosphite* | 2:98 |
| 3 | ditridecyl thiodipropionate** | 2:98 |
| 4 | triisopropanolamine (TIPA) | 2:98 |
| 5 | 3,6,9-trioxaundecane-1,11-bis (3-n-dodecylthiopropionate) | 2:98 |
| 6 | sodium borohydride, NaBH$_4$ | 0.15:99.85 |

*Obtained as Polygard, a trademark of Uniroyal, Inc.
**Abbreviated DTDTDP

Samples of each of the experimental blends were placed in closed glass jars in an air oven at 100° C. These samples were observed periodically for 20 hours. It was found that heat had a definite effect on the color of the material. Whereas, the six original samples were uniformly off-white in color, after four hours in the oven color changes were noted. The control and the Polygard, DTDTDP and sodium borohydride treated samples were changing to a light green color. The 3,6,9-trioxaundecane-1,11-bis(3-n-dodecylthiopropionate) sample was becoming a light gray color. The only sample appearing to be unchanged contained TIPA. After 20 hours at 100° C., the samples were removed from the oven. At this time the green color of the control and the Polygard and sodium borohydride treated samples had intensified, the DTDTDP treated sample showed a less intense green color, the 3,6,9-trioxaundecane-1,11-bis(3-n-dodecylthiopropionate) sample was light gray, and the TIPA sample had become slightly tan.

In order to determine the degree of color change in the aged powder samples they were evaluated with a color measuring spectrophotometer. These data are listed in Table 2.

Table 2

| Sample | 1 | 2 | 3 | 4 | 5 | 6 |
|---|---|---|---|---|---|---|
| Original Color | | | | | | |
| Rd | 57.56 | 58.19 | 58.04 | 62.08 | 62.27 | 58.21 |
| a | −0.11 | 0.05 | 0.75 | 1.04 | 1.43 | 0.57 |
| b | 7.46 | 7.46 | 7.41 | 7.55 | 7.85 | 7.31 |
| ΔE | 25.75 | 25.40 | 25.65 | 23.43 | 23.62 | 25.46 |
| Color after 20 hours @ 100° C. | | | | | | |
| Rd | 32.93 | 36.59 | 42.79 | 58.98 | 55.61 | 36.22 |
| a | −6.71 | −7.21 | −4.43 | 1.36 | −0.49 | −6.85 |
| b | 10.27 | 10.50 | 8.27 | 8.83 | 7.48 | 10.14 |
| ΔE | 43.85 | 41.00 | 35.59 | 26.01 | 26.89 | 41.18 |
| Color Change | | | | | | |
| Rd | −24.58 | −21.60 | −15.25 | −3.10 | −6.66 | −21.99 |
| a | −6.60 | −7.26 | −5.18 | 0.32 | −1.92 | −7.42 |
| b | 2.81 | 3.04 | 0.85 | 1.28 | 0.37 | 2.83 |
| ΔE | 18.10 | 15.60 | 9.94 | 2.58 | 3.27 | 15.72 |

In Table 2 color measurements are based on the Rd, a, b Coordinate System in which an RD of 100 is perfect reflectance compared to freshly fumed magnesium oxide, and an Rd of 0 is a black body (perfect absorbance). Positive a represents red; negative a green; positive b yellow; and negative b blue. The greater the absolute value of a or b, the greater is the intensity of color. ΔE is the linear deviation from magnesium oxide white using the L, $a_L$, $b_L$ notation system. The smaller is ΔE, the closer color is to white.

The color data for the original samples support the observation that they were highly similar in color. Data for the oven aged samples depicts and correlates with the observed color changes. Changes in the values for Rd, a, B, and ΔE were calculated as shown in the table. The largest change was in the untreated control sample. The next greatest changes were in the Polygard and sodium borohydride treated samples which had practically identical color data. The DTDTDP treated sample also showed marked changes, but less than those containing Polygard or sodium borohydride. Additives TIPA and 3,6,9-trioxaundecane-1,11-bis(3-n-dodecylthiopropionate) were effective in preventing the development of the green color. The TIPA sample showed a slight change to a tan color. The 3,6,9-trioxaundecane-1,11-bis(3-n-dodecylthiopropionate) sample showed a slightly greater change to a grayish hue.

The results of the oven aging tests support the theory that chemical change prompted by heat input during the blending operation is the probable cause of the green color which sometimes occurs in Wingstay 29 powder.

EXAMPLE II

Similar tests were made using TIPA and triethanolamine (TEA) as color inhibitors for the following age-resisters:
Wingstay 29

Liquid octylated diphenylamine (abbreviated ODPA)

Liquid N-phenyl-N'-(1,3-dimethylbutyl)-p-phenylene-diamine obtained as Wingstay 300, trademark of Goodyear Tire & Rubber Company.

Powdered p,p'di[2-phenyl-2-propyl]diphenylamine (abbreviated PPDPA)

Powdered polymerized 2,2,4-trimethyl-1,2-dihydroquinoline (abbreviated DHQ)

The testing was similar to that of Example I, except that the samples were aged and tested in 2 inch Petri dishes (approximately ⅛ inch deep layer) instead of closed glass jars. Color was measured on the aged samples after they had cooled to room temperature.

The data appears in Tables 3–7. For Tables 3–5 (the liquid) age-resisters) the samples were prepared as follows:

A. The color inhibitor and age-resistor were blended at about 82° C.

B. The Micro-Cel E was heated in a mortar equipped with a heating mantle to roughly 82° C., and the age-resister/color inhibitor combination in A worked in with a pestle. For this example, the weight ratio of liquid diphenylamine to Micro-Cel E was 50:50.

For Tables 6–7 (solid age-resisters) no Micro-Cel E filler was necessary, and the samples were prepared as follows:

A. Since both TIPA and TEA are water soluble, a water solution of color inhibitor was mixed with the solid, powdered age-resister.

B. The wet age-resister/color inhibitor combination was dried at about 70° C. for 16 hours. The resulting dry powder was tested for discoloration upon aging.

TABLE 3

| Sample | Wingstay 29 | | | | | | |
|---|---|---|---|---|---|---|---|
| | 4112 | 4113 | 4114 | 4115 | 4116 | 4117 | 4130 |
| Weight Ratio | | | | | | | |
| TIPA: Wingstay 29 | 25:99.75 | 1.0:99 | 3.0:97 | | | | 0 |
| TEA: Wingstay 29 | | | | .25:99.75 | 1.0:99 | 3.0:97 | 0 |
| Original Color | | | | | | | |
| Rd | 59.2 | 61.7 | 66.9 | 60.7 | 63.7 | * | 60.9 |
| a | −3.5 | −2.6 | −.3 | −3.3 | −2.2 | | −2.9 |
| b | 3.6 | 5.5 | 7.1 | 3.1 | 4.3 | | 3.6 |
| ΔE | 23.6 | 22.3 | 19.6 | 22.6 | 20.8 | | 22.4 |
| 20 Hrs. 100° C. Color | | | | | | | |
| Rd | 46.3 | 54.9 | 60.8 | 46.0 | 52.6 | | 43.3 |
| a | −6.1 | −4.4 | −.7 | −7.2 | −5.5 | | −7.1 |
| b | 8.4 | 8.8 | 6.3 | 8.9 | 7.5 | | 9.4 |
| ΔE | 33.5 | 27.7 | 22.9 | 34.1 | 29.0 | | 36.1 |
| Change | | | | | | | |
| ΔRd | −15.9 | −6.8 | −6.1 | −14.7 | −11.1 | | −17.6 |
| Δa | −2.6 | −1.8 | −.4 | −3.9 | −3.3 | | −4.2 |
| Δb | +4.8 | +3.3 | −.8 | +5.8 | +3.2 | | +5.8 |
| Δ(ΔE) | +9.9 | +5.4 | +3.3 | +11.5 | +8.2 | | +13.7 |

*Sample not prepared due to solubility problems.

TABLE 4

| Sample | Octylated Diphenylamine | | | | | | |
|---|---|---|---|---|---|---|---|
| | 4100 | 4101 | 4102 | 4103 | 4104 | 4105 | 4132 |
| Weight Ratio | | | | | | | |
| TIPA:ODPA | .25:99.75 | 1.0:99 | 3.0:97 | | | | 0 |
| TEA:ODPA | | | | .25:99.75 | 1.0:99 | 3.0:97 | 0 |
| Original Color | | | | | | | |
| Rd | 54.1 | 62.3 | 61.6 | 56.7 | 59.1 | * | 56.7 |
| a | −1.6 | −.5 | −.8 | −1.3 | −1.0 | | −1.9 |
| b | 5.3 | 8.0 | 8.2 | 7.6 | 8.4 | | 6.5 |
| ΔE | 27.0 | 22.6 | 23.0 | 25.9 | 24.6 | | 25.6 |
| 20 Hrs. 100° C. Color | | | | | | | |
| Rd | 40.3 | 52.3 | 57.0 | 41.6 | 49.6 | | 40.7 |
| a | −2.7 | −1.4 | −.7 | −3.1 | −1.6 | | −3.0 |
| b | 5.0 | 6.2 | 7.7 | 5.9 | 7.0 | | 5.5 |
| ΔE | 36.9 | 28.4 | 25.7 | 36.1 | 30.4 | | 36.7 |
| Change | | | | | | | |
| ΔRd | −13.8 | −10.0 | −4.6 | −15.1 | −9.5 | | −16.1 |
| Δa | −1.1 | −.9 | −.1 | −1.8 | −.6 | | −1.1 |
| Δb | −.3 | −1.8 | −.5 | −1.7 | −1.4 | | −1.0 |
| Δ(Δ$_E$) | +9.9 | +5.8 | +2.7 | +10.2 | +5.8 | | +11.1 |

*Sample not prepared due to solubility problems

TABLE 5

| Sample | Wingstay 300 | | | | | | |
|---|---|---|---|---|---|---|---|
| | 4106 | 4107 | 4108 | 4109 | 4110 | 4111 | 4131 |
| Weight Ratio | | | | | | | |
| TIPA: Wingstay 300 | .25:99.75 | 1.0:99 | 3.0:97 | | | | 0 |
| TEA: Wingstay 300 | | | | .25:99.75 | 1.0:99 | 3.0:97 | 0 |
| Original Color | | | | | | | |

TABLE 5-continued

| | Wingstay 300 | | | | | | |
|---|---|---|---|---|---|---|---|
| Sample | 4106 | 4107 | 4108 | 4109 | 4110 | 4111 | 4131 |
| Rd | 16.4 | 19.5 | 18.8 | 17.8 | 17.9 | 22.1 | 18.8 |
| a | 7.6 | 7.9 | 7.2 | 7.9 | 7.8 | 7.6 | 7.9 |
| b | 5.1 | 6.6 | 11.4 | 5.3 | 6.2 | 10.2 | 5.4 |
| ΔE | 60.0 | 56.6 | 57.8 | 58.4 | 58.3 | 54.2 | 57.3 |
| 20 Hrs. 100° C. Color | | | | | | | |
| Rd | 8.7 | 8.7 | 9.7 | 8.4 | 9.7 | 11.2 | 8.3 |
| a | 1.5 | 2.1 | 2.2 | 1.3 | 2.0 | 2.5 | 1.4 |
| b | 7.5 | 8.7 | 10.9 | 7.6 | 9.8 | 12.3 | 7.7 |
| ΔE | 70.8 | 70.9 | 69.4 | 71.3 | 69.3 | 67.3 | 71.5 |
| Change | | | | | | | |
| ΔRd | −7.7 | −10.8 | −9.1 | −9.4 | −8.2 | −10.9 | −11.5 |
| Δa | −6.1 | −5.8 | −5.0 | −6.6 | −5.8 | −5.1 | −.2 |
| Δb | +2.4 | +2.1 | −.5 | +2.6 | +3.6 | +2.1 | +2.3 |
| Δ(ΔE) | +10.8 | +14.3 | +11.6 | +13.9 | +11.0 | +13.1 | +14.2 |

TABLE 6

| | p,p'-di[2-phenyl-2-propyl]diphenylamine | | | | | | |
|---|---|---|---|---|---|---|---|
| Sample | 4124 | 4125 | 4126 | 4127 | 4128 | 4129 | 4133 |
| Weight Ratio | | | | | | | |
| TIPA:PPDPA | .25:99.75 | 1.0:99 | 3.0:97 | | | | 0 |
| TEA:PPDPA | | | | .25:99.75 | 1.0:99 | 3.0:97 | 0 |
| Original Color | | | | | | | |
| Rd | 65.0 | 65.5 | 67.9 | 65.9 | 69.2 | 68.6 | 72.0 |
| a | .4 | .8 | .5 | .8 | .7 | .7 | 0.5 |
| b | 8.1 | 7.5 | 7.9 | 7.1 | 7.7 | 7.4 | 4.7 |
| ΔE | 21.0 | 20.5 | 19.3 | 20.1 | 18.5 | 18.7 | 15.9 |
| 20 Hrs. 100° C. Color | | | | | | | |
| Rd | 42.0 | 42.4 | 38.1 | 40.8 | 42.5 | 41.9 | 47.1 |
| a | 0.6 | 1.3 | 1.8 | 1.7 | 1.5 | 2.1 | 1.2 |
| b | 9.1 | 10.0 | 10.4 | 8.3 | 9.1 | 10.2 | 11.3 |
| ΔE | 36.3 | 36.2 | 39.6 | 37.0 | 35.9 | 36.7 | 33.3 |
| Change | | | | | | | |
| ΔRd | −23.0 | −23.1 | −29.8 | −15.1 | −16.7 | −16.7 | −25.9 |
| Δa | +.2 | +.5 | +1.3 | +.9 | +.8 | +1.4 | +.7 |
| Δb | +1.0 | +2.5 | +2.5 | +1.2 | +3.4 | +2.8 | +6.6 |
| Δ(ΔE) | +15.3 | +15.7 | +20.3 | +16.9 | +17.4 | +18.0 | +17.4 |

TABLE 7

| | Polymerized 2,2,4-trimethyl-1,2-dihydroquinoline | | | | | | |
|---|---|---|---|---|---|---|---|
| Sample | 4118 | 4119 | 4120 | 4121 | 4122 | 4123 | 4134 |
| Weight Ratio | | | | | | | |
| TIPA:DHQ | .25:99.75 | 1.0:99 | 3.0:97 | | | | 0 |
| TEA:DHQ | | | | .25:99.75 | 1.0:99 | 3.0:97 | 0 |
| Original Color | | | | | | | |
| Rd | 51.6 | 49.0 | 45.0 | 49.4 | 51.1 | 50.9 | 51.0 |
| a | 1.5 | 2.2 | 2.7 | 1.9 | 1.6 | 1.7 | 1.9 |
| b | 24.5 | 25.6 | 26.1 | 25.5 | 24.9 | 25.1 | 22.1 |
| ΔE | 37.2 | 39.2 | 41.7 | 38.9 | 37.7 | 37.9 | 36.0 |
| 20 Hrs. 100° C. Color | | | | | | | |
| Rd | 34.2 | 26.5 | 18.7 | 34.0 | 28.0 | 20.0 | 24.6 |
| a | 5.7 | 7.6 | 8.4 | 5.8 | 7.6 | 8.4 | 6.3 |
| b | 27.6 | 26.2 | 22.4 | 27.6 | 26.9 | 23.6 | 21.7 |
| ΔE | 49.3 | 54.5 | 60.4 | 49.5 | 53.6 | 58.9 | 54.4 |
| Change | | | | | | | |
| ΔRd | −17.4 | −22.5 | −26.3 | −15.4 | −23.1 | −30.9 | −26.4 |
| Δa | +4.2 | 5.4 | 5.7 | 3.9 | 6.0 | 6.7 | +4.4 |
| Δb | +3.1 | +.6 | −3.7 | +2.1 | +2.0 | −1.5 | −.4 |
| Δ(ΔE) | +12.1 | +15.3 | +18.7 | +10.6 | +15.7 | +21.0 | +18.4 |

From the Tables, it can be observed that:

1. The described method of color stabilization works with the liquid diphenylamines absorbed on calcium silicate filler (Tables 3 and 4) but not with solid diphenylamines (Table 6). In fact increasing amounts of TIPA and TEA actually darkened the samples in Table 6.
2. TEA is an effective color inhibitor, though not as effective as TIPA.
3. The effectiveness of color inhibitor increases with increasing concentration (Tables 3 and 4).
4. Although both TIPA and TEA may have helped slightly to reduce machine color values of the p-phenylenediamine, the results of Table 5 are inconclusive because of the very dark original colors.
5. The method darkened the solid dihydroquinoline derivative in Table 7 with increasing amounts of TIPA or TEA, indicating again that the method is specific to diphenylamine derivatives.

Other embodiments of this invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. In a solid aromatic amine gas-resister composition comprising:

A. a liquid diphenylamine having the formula

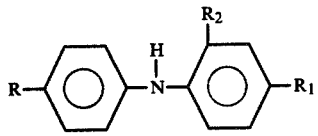

wherein R and $R_1$ are selected from hydrogen (provided only one of them is hydrogen) tertiary alkyl radicals having 4 to 12 carbon atoms (4–12C) and the group

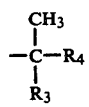

wherein $R_3$ is selected from H and methyl and $R_4$ is selected from phenyl and p-tolyl radicals; and $R_2$ is selected from H and 1-methyl benzyl, B. absorbed on a hydrous calcium silicate filler material, the improvement which comprises those compositions which contain a color inhibitor selected from the group consisting of trialkylol amines having the structure:

$$N-(R_5OH)_3$$

wherein $R_5$ is an alkylene radical of from 2 to 5 carbons (2–5C);

glycol diesters having the following structure:

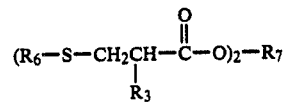

wherein $R_6$ is an alkyl radical (1–24C), $R_7$ is a polyalkyl glycol radical having the structure:

wherein n is an integer from 1 to 7; and dialkyl esters of thiodicarboxylic acids having the structure:

wherein $R_8$ is an alkyl (11–15C) and $R_9$ is an alkylene (2–3C), in a weight ratio of color inhibitor to p-styrenated diphenylamine of from 0.25:99.75 to 5:95, and wherein the weight ratio of liquid diphenylamine plus color inhibitor to the filler material of Part B is from 80:20 to 50:50.

2. The improvement in a solid aromatic amine age-resister composition as recited in claim 1, wherein the liquid diphenylamine of Part A is the Friedel-Crafts reaction product of diphenylamine and styrene in a weight ratio of about 1:2 diphenylamine to styrene, the most prevalent components of which have the formula

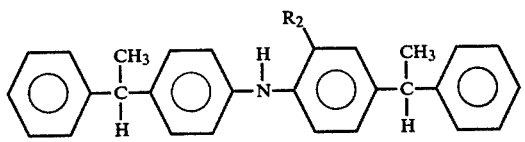

3. The improvement as recited in claim 2, wherein the filler material of Part B is a synthetic, hydrous calcium silicate produced by the hydrothermal reaction of diatomaceous silica, hydrated lime and water.

4. The improvement as recited in claim 3, wherein the color inhibitor is selected from the group consisting of tri-isopropanolamine, triethanolamine and 3,6,9-trioxaundecane-1,11-bis(3-n-dodecylthiopropionate).

5. The improvement as recited in claim 4, wherein the ratio of styrenated diphenylamine to color inhibitor is about 98:2 and wherein the ratio of styrenated diphenylamine plus color inhibitor to the filler material of Part B is about 70:30.